Nov. 11, 1958   H. W. KLEIST   2,859,945
ASSEMBLY FOR HEATING AND COOLING TRUCKS
Filed Oct. 25, 1955   3 Sheets-Sheet 1
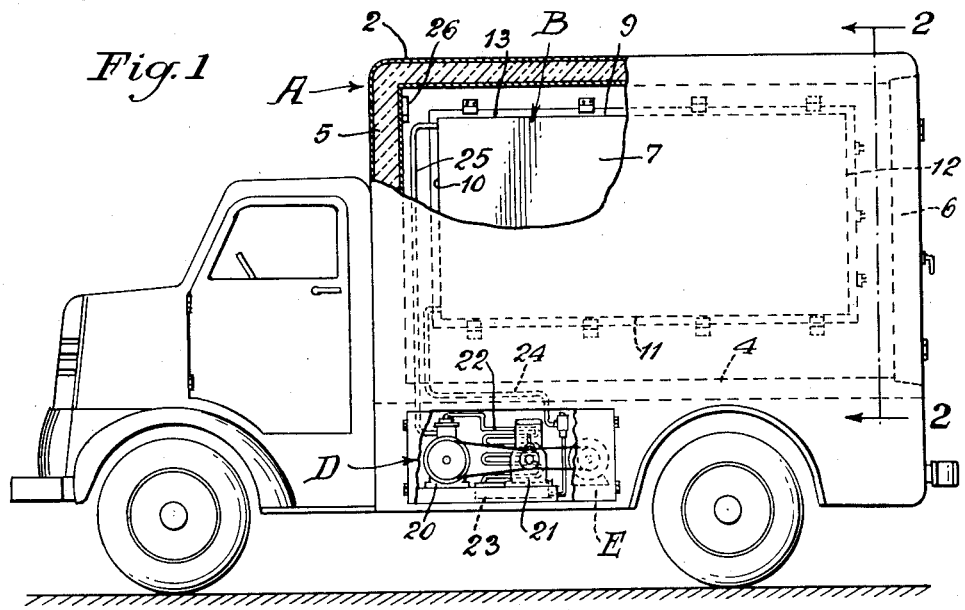
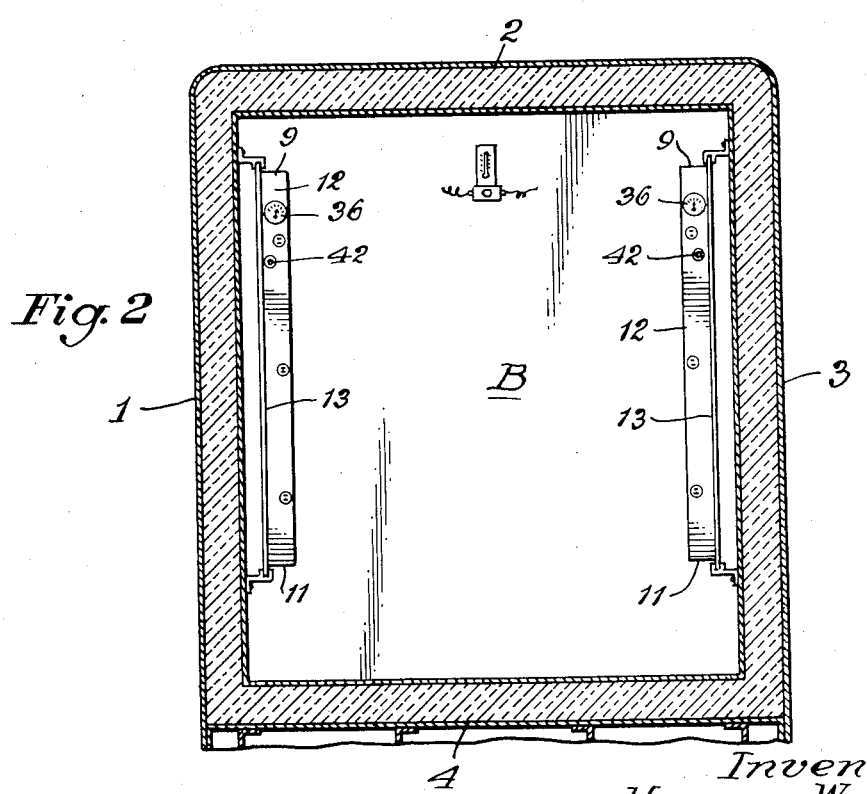
Inventor
Herman W. Kleist
by Parker & Carter
Attorneys

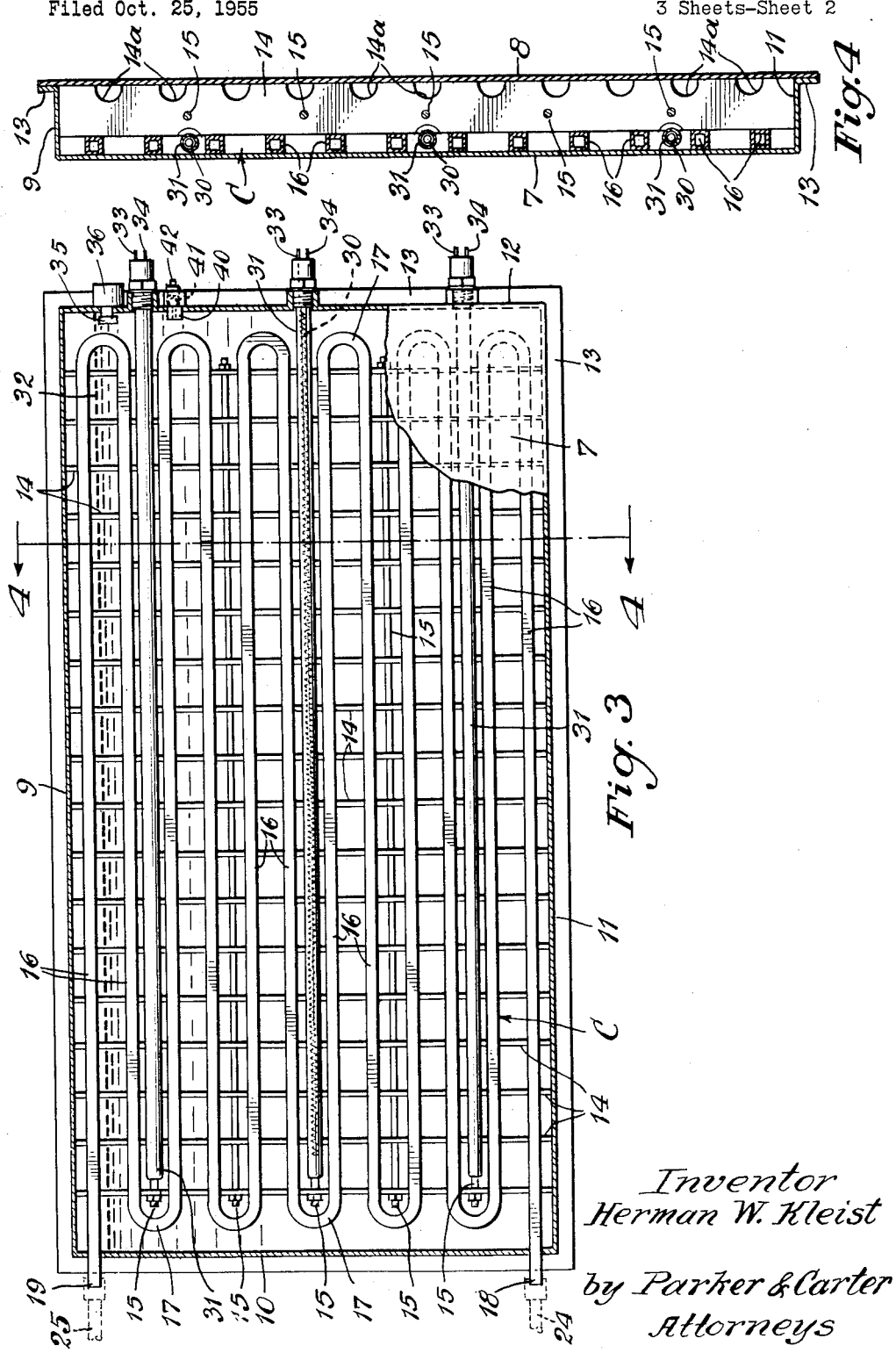
Nov. 11, 1958     H. W. KLEIST     2,859,945
ASSEMBLY FOR HEATING AND COOLING TRUCKS
Filed Oct. 25, 1955     3 Sheets-Sheet 2
Inventor
Herman W. Kleist
by Parker & Carter
Attorneys

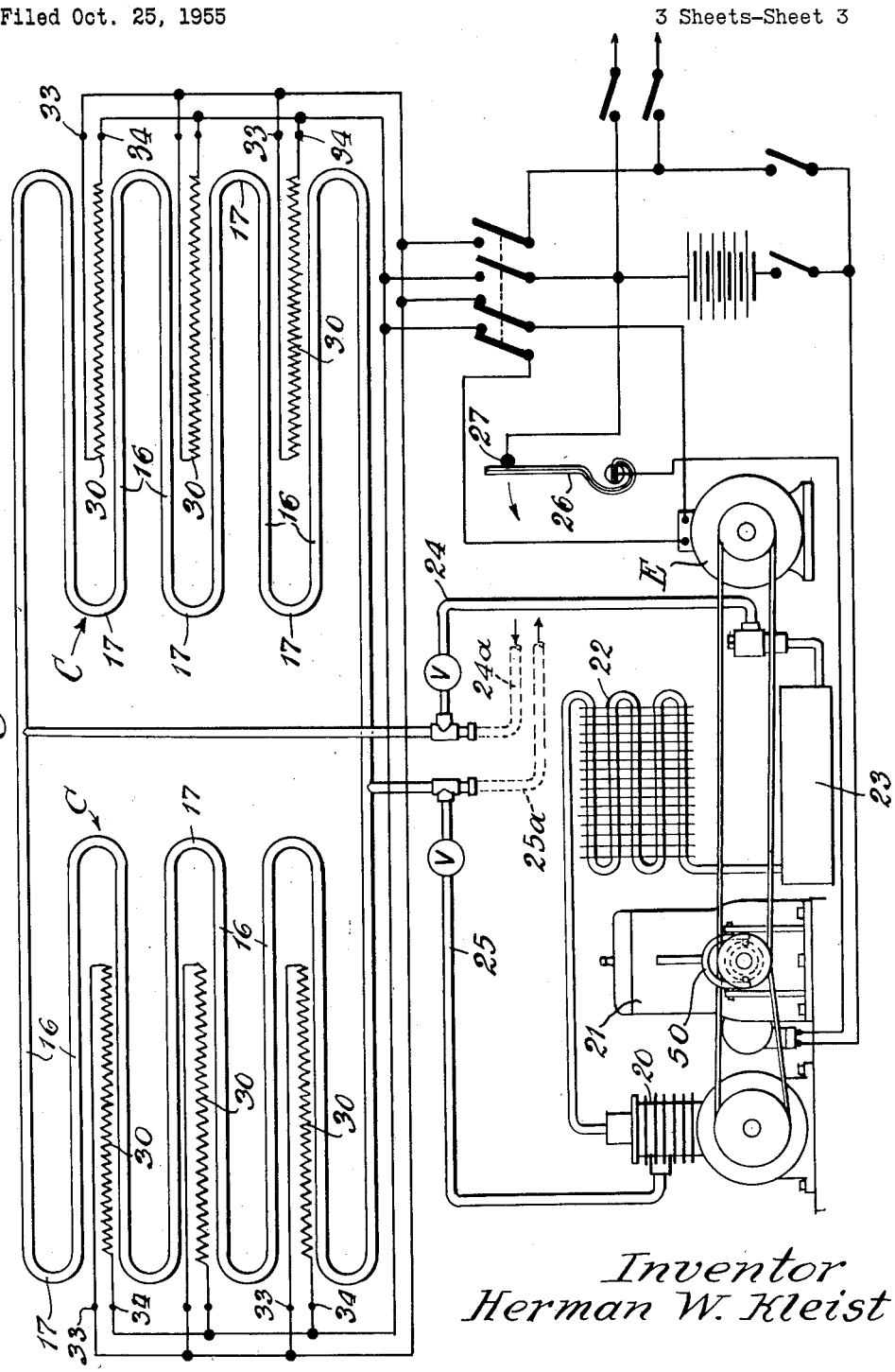

United States Patent Office 2,859,945
Patented Nov. 11, 1958

2,859,945

ASSEMBLY FOR HEATING AND COOLING TRUCKS

Herman W. Kleist, Hollywood, Ill., assignor to Dole Refrigerating Company, Chicago, Ill., a corporation of Illinois Application October 25, 1955, Serial No. 542,684

2 Claims. (Cl. 257—9)

This invention relates to an improvement in means for maintaining a generally even temperature in refrigerated trucks during fluctuations or changes of temperature of the air exterior to such truck or vehicle.

One purpose is to provide an improved heating and cooling plate which may be used in a truck or conveyance to maintain a temperature in the storage space of the conveyance close to but somewhat above freezing.

Another purpose is to provide a truck and plate assembly which includes a stand-by or storage body adapted to serve as a cooling medium in warm weather and as a heating medium in cool weather.

Another purpose is to provide an improved truck plate in which a heat storage body or liquid has associated with it both a heating means and a cooling means.

Other purposes will appear from time to time in the course of the specification and claims.

I illustrate my invention more or less diagrammatically in the accompanying drawings, wherein:

Figure 1 illustrates a truck or vehicle embodying my invention, with parts in elevation, parts broken away, and parts in section;

Figure 2 is a section on an enlarged scale on the line 2—2 of Figure 1;

Figure 3 is an elevation of one of my plates with parts broken away and parts in section;

Figure 4 is a section on an enlarged scale on the line 4—4 of Figure 3; and

Figure 5 is a diagrammatic showing of the cooling and control assembly.

Referring to the drawings, A generally indicates a vehicle or conveyance therein shown as a motor truck. This truck is shown as including a storage portion in which a storage space B is surrounded by insulated walls and floor 1, 2, 3, 4 and 5, with a suitable insulated door 6. Thus the space B is sufficiently insulated from the ambient air, for all practical purposes.

Assume that the vehicle in question is employed for transporting or delivering goods which are to be kept at low but above freezing temperatures, a problem arises when the vehicle is used at different outdoor temperatures or in periods when the outdoor temperature is sharply changing. For example, in the handling of milk it is important that the milk is not frozen during its handling. It is also important that the temperature of the milk does not rise more than a predetermined degree above the freezing temperature.

A primary purpose of my invention is to provide means for maintaining in the storage space B a proper range of temperature which is neither too low nor too high for the handling of milk, vegetables and a number of other heat sensitive materials. As a means for maintaining this desired temperature I provide one or more units or plates, shown in detail in Figures 3 and 4, which may be described as follows:

In the particular form shown in the drawings each such plate is shown as having parallel spaced side walls 7, 8 and circumferential edge walls 9, 10, 11 and 12.

Whereas units of this type may be made in various ways, I find it advantageous to have one of the side wall members, such as 7, upset around its edges to form the circumferential walls 9 to 12, inclusive. These circumferential walls, in turn, may be outwardly flanged, as at 13, at their upper edges, and the flanges 13 may receive the opposite side plate wall 8. The structure thus formed may be welded or otherwise sealed to provide a substantially gas-tight container. Within the container thus formed, I illustrate a plurality of spacing vanes or ribs 14 which, in turn, may be spaced, or connected, by rods or other equivalent elements 15. It will be understood that the interior of the plate is substantially, or at least partially, filled with a suitable liquid or heat storage material. It may be advantageous, when a liquid is used, to permit this liquid to circulate or to be free to move throughout the interior of the plate, for example, for ease in filling the plate. I may find it advantageous, for example, to notch or cut away edges of the spacing vanes 14, as at 14a in Figure 4.

I illustrate the opposite edge of the vanes 14 as abutting an evaporator coil, generally indicated as C. This coil may, for example, include a number of parallel pipe lengths 16 connected by bends 17. 18 may illustrate an inlet connection for the evaporator coil thus formed, and 19 is an outlet connection. Assuming that the plate is substantially filled with a suitable eutectic or other liquid, it will be seen that the evaporator coil is in heat exchange relation with such liquid.

In order to cool the liquid I may circulate a suitable refrigerant through the cooling coil C. In practice I find it advantageous to cycle a volatile refrigerant therethrough. I may, for example, employ a cycling unit mounted on the truck itself. I indicate such a unit generally at D in Figure 1. It may include, for example, a compressor 20 and a driving motor 21 therefor. 22 indicates a condenser and 23 a receiver. The supply or pressure pipe 24 extends to the inlet end of the evaporator coil C, and the return or suction pipe 25 extends from the outlet of the evaporator coil to the suction side of the compressor 20. 24a and 25a are alternative connections, the purpose of which will later appear. The operation of the motor 21 may be controlled by a suitable thermostat or heat responsive element 26 controlling a switch 27, as shown in the diagrammatic illustration of Figure 5. Assume that the truck is being used for delivery in warm weather, the motor 21 may be employed to operate the compressor 20 to cycle a volatile refrigerant through the evaporator coil C until a suitable low temperature is indicated between heat responsive elements 26. The motor will then cease to operate.

It may be advantageous to employ a eutectic in the plate which is frozen by the abstraction of heat from the eutectic by the cycled or circulated refrigerant. In such event a eutectic may be employed with a relatively high melting point of the order, for example, of 18 to 20 degrees Fahrenheit. Such a frozen body of eutectic provides a stand-by of refrigerating effect which may be effective for many hours. Under many circumstances, where the vehicle is used on relatively short runs or for relatively short periods, the cycling unit shown at D in Figure 1 may be unnecessary, and may be omitted. In such an event the coil ends 18 and 19 may be connected at the garage to any suitable connection for cycling or circulating a refrigerant through the coil C, as by the connections 24a and 25a of Figure 5. Brine may be employed as a refrigerant, or any suitable volatile refrigerant, the essential being that when the vehicle is serviced at its central station or garage the eutectic body may be reduced to a temperature sufficient to freeze it to its critical temperature. Of course, the freezing temperature of the eutectic selected must be related to the temperature desired within the storage space B and must not, where milk or similar materials are being handled, be so low as to freeze the handled goods.

Whereas the cold storage effect of freezing eutectic or of maintaining a circulation of a cooling medium through the plates is satisfactory when the conveyance is being used in an outdoor temperature substantially in excess of that desirable for the good handled, when the truck is used in cold weather it may be equally important to prevent the outside ambient temperature from freezing the goods. Under such conditions I provide means for employing the material or liquid in the plates as a heat storage means.

I show, for example, in Figures 3 and 4, a resistance element, generally indicated as 30, which may be surrounded by a tube or container 31 shown as removably inserted into the interior of the plate at a level substantially below the top surface of the eutectic or liquid, as indicated at 32. A plurality is shown for each plate.

Conductors 33, 34 may be connected to any suitable source of current. An advantageous method is to connect the resistance element at the garage or station with any suitable source of commercial electric current, and heat the liquid in the plate to a predetermined temperature. I may, for example, have a heat responsive element within the liquid, as at 35, and an exterior indicator as at 36 to indicate the temperature within the plate. It is also possible, if desired, to have the element 35 operate a cut-off switch for cutting off the flow of electric power when the temperature of the liquid within the plate reaches a predetermined maximum.

Whereas, I find it advantageous to employ a source of commercial electric current at a garage or station, it will also be understood that I may provide means on the truck itself for heating the resistance 30. I illustrate diagrammatically, as in Figure 5, a storage battery E which may be connected to the resistance.

It will be realized that I have described and shown a practical and operative device, but that, nevertheless, many changes may be made in size, shape, number and disposition of parts and in control means without departing from the spirit of my invention. I therefore wish my description and drawings to be taken as in a broad sense illustrative or diagrammatic. It will be understood, for example, that the plates may be both heated and cooled at a central point or garage, or they may be both heated and cooled by equipment carried on the truck. Where I employ, on the truck equipment, either a cycling unit D or electric power means E, or both, it will be understood, of course, that I prefer to provide, also, alternative connecting means so that the plates may be either heated or cooled, or both heated and cooled at a central station.

It will be understood that the electric power source shown at E in Figure 1 may be a battery or a generator. If a generator is employed it may be driven by the motor 21 which operates the compressor. A clutch 50 is diagrammatically illustrated, which permits the motor 21 to operate, selectively, either the compressor 20 or the generator E.

It will also be understood that I may, if desired, maintain a less-than-atmospheric pressure within the plate. I illustrate, for example, in Figure 3, a pipe or connection 40 through which air may be exhausted, the valve or ball 41 serving to prevent, thereafter, the inflow of outside air. 42 is a closure exterior to the ball. It will be understood that the excess atmospheric pressure maintains the plate side walls tight and in firm contact with the spacing vanes 14, and with the evaporator coil C.

The use and operation of the invention are as follows:

I provide a storage space, shown as the storage space of a truck, which is surrounded by insulated walls and to which access is had by an insulated door.

Assume, as an example, that vegetable or dairy goods are to be dispensed and delivered. In summer the plates are used for their cooling effect. In winter they are used for their heating effect. Under either condition the body of liquid, whether heated or cooled, serves as a storage means of heat or of cold, as the case may be.

Another use of my invention is in situations where the same container or conveyance or vehicle may, at some times, be employed for handling materials to be kept below ambient temperature, and may, at other times, be employed in handling materials which must be kept at above ambient temperature. A mere change in seasons or in outside temperatures may be involved, or the employment of the same vehicle to handle, at different times, materials having different optimum handling temperatures.

I claim:

1. For use in delivery trucks and the like having storage containers which may be subjected to extreme variations in ambient temperature, a combination refrigeration and heating element for maintaining the temperature of the storage space within a preselected range through the extreme variations of ambient temperature, including a plate having substantially parallel exposed spaced side walls and edge walls connecting said side walls in direct heat exchange relation with the air in the space and having therein a substantial body of liquid, an evaporator coil in the plate between the side walls and including a plurality of generally parallel somewhat equally spaced rectilinear lengths of tubing interconnected by integral return bends, the lengths extending longitudinally along and in contact with one side wall, a plurality of spacer elements disposed transversely of the lengths in the space between the other side wall and the coil and abutting both the other side wall and the coil whereby the coil is in contact at all times with said one side wall, one of the edge walls having a plurality of spaced apertures disposed in the plane of the evaporator coil, and a plurality of individual rectilinear electrical resistance heating elements, each being positioned in the general plane of the coil and interposed between and generally parallel to adjacent tube lengths of the coil, the inner end of each heating element being disposed toward a return bend of the coil remote from said apertures, and the other end of each heating element being disposed and secured in an aperture in the said one edge wall, the heating elements being generally parallel to each other and generally equally spaced as to each other as well as between adjacent tube lengths.

2. The structure of claim 1 further characterized in that the spacer elements are apertured to provide for liquid flow, and the heating elements are removably mounted in the apertures in the said one edge wall.

References Cited in the file of this patent

UNITED STATES PATENTS

| | | |
|---|---|---|
| 2,000,467 | Lindseth | May 7, 1935 |
| 2,398,273 | Albers et al. | Apr. 9, 1946 |
| 2,638,754 | Kleist | May 19, 1953 |
| 2,701,455 | Kleist | Feb. 8, 1955 |
| 2,726,515 | Kleist | Dec. 13, 1955 |